United States Patent
Soman (10) Patent No.: US 11,675,902 B2
(45) Date of Patent: Jun. 13, 2023

(54) SECURITY DETECTION SYSTEM WITH PRIVILEGE MANAGEMENT

(71) Applicant: VMware, Inc., Palo Alto, CA (US)

(72) Inventor: Sisimon Soman, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 416 days.

(21) Appl. No.: 16/211,092

(22) Filed: Dec. 5, 2018

(65) Prior Publication Data

US 2020/0184074 A1 Jun. 11, 2020

(51) Int. Cl.
| | |
|---|---|
| G06F 21/56 | (2013.01) |
| G06F 21/55 | (2013.01) |
| G06F 9/445 | (2018.01) |
| G06N 20/00 | (2019.01) |

(52) U.S. Cl.
CPC ............ *G06F 21/566* (2013.01); *G06F 9/445* (2013.01); *G06F 21/554* (2013.01); *G06F 21/567* (2013.01); *G06F 2221/033* (2013.01); *G06N 20/00* (2019.01)

(58) Field of Classification Search
CPC .................. G06F 21/566; G06F 21/554; G06F 2221/033; G06F 21/577; G06N 20/00
USPC ........................................................ 726/23
See application file for complete search history.

(56) References Cited

U.S. PATENT DOCUMENTS

| | | | |
|---|---|---|---|
| 5,113,442 | A | 5/1992 | Moir |
| 6,289,462 | B1 | 9/2001 | McNabb et al. |
| 7,383,437 | B1 | 6/2008 | Dik |
| 7,669,050 | B2 | 2/2010 | Blinick et al. |
| 8,074,288 | B2 | 12/2011 | Sambotin et al. |
| 8,442,960 | B1 | 5/2013 | Meyer et al. |
| 8,677,477 | B2 | 3/2014 | Kim et al. |
| 9,213,571 | B2 | 12/2015 | Ristovski et al. |
| 9,348,742 | B1 * | 5/2016 | Brezinski .............. G06F 21/566 |
| 10,419,469 | B1 * | 9/2019 | Singh .................... H04L 67/306 |
| 10,445,505 | B2 * | 10/2019 | Rebelo .................. G06F 21/566 |
| 10,565,378 | B1 * | 2/2020 | Vincent .................... G06F 21/54 |
| 10,594,714 | B2 * | 3/2020 | Crabtree ............. H04L 63/1425 |
| 10,747,875 | B1 | 8/2020 | Staler |
| 2002/0188649 | A1 | 12/2002 | Karim |

(Continued)

OTHER PUBLICATIONS

Huculak, How to Create an Automated Task Using Task Scheduler on Windows 10, archived May 2019, acquired from https://web.archive.org/web/20190515110012/https://windowscentral.com/how-create-automated-task-using-task-scheduler-windows-10 (Year: 2019).

*Primary Examiner* — Saleh Najjar
*Assistant Examiner* — Peiliang Pan
(74) *Attorney, Agent, or Firm* — Patterson + Sheridan, LLP (57) ABSTRACT

A system and method of de-elevating a process created in a computing device of a computer system are disclosed. In certain aspects, a method includes detecting a user login within a login session of a computing device in the computer system, the login session having a default security context. The method also includes creating a de-elevated security context for the login session, wherein the de-elevated security context has fewer privileges than the default security context. The method also includes detecting a process being created within the login session. The method further includes determining that the process is potentially malicious by comparing an intended state and a digital profile of the computing device. The method also includes launching the process using the de-elevated security context.

18 Claims, 5 Drawing Sheets

(56) References Cited

U.S. PATENT DOCUMENTS

| | | | |
|---|---|---|---|
| 2005/0091658 A1 | 4/2005 | Kavalam et al. | |
| 2005/0289545 A1 | 12/2005 | Blinick et al. | |
| 2006/0053426 A1 | 3/2006 | Dive-Reclus et al. | |
| 2006/0206489 A1* | 9/2006 | Finnie | G06F 9/5061 |
| 2006/0253909 A1 | 11/2006 | Cherepov | |
| 2007/0050369 A1 | 3/2007 | Stiegler et al. | |
| 2007/0199068 A1* | 8/2007 | Russinovich | G06F 12/1491 726/16 |
| 2008/0040398 A1* | 2/2008 | Robinson | G06F 16/25 |
| 2008/0134325 A1 | 6/2008 | Kim et al. | |
| 2009/0328129 A1* | 12/2009 | Desai | G06F 21/6209 726/1 |
| 2011/0185338 A1* | 7/2011 | Mital | G06Q 10/10 717/101 |
| 2012/0101856 A1* | 4/2012 | Tran | G06Q 40/08 705/4 |
| 2012/0110174 A1* | 5/2012 | Wootton | H04W 4/00 709/224 |
| 2013/0333056 A1* | 12/2013 | Ristovski | G06F 9/468 726/30 |
| 2014/0096182 A1 | 4/2014 | Smith | |
| 2014/0201830 A1 | 7/2014 | Kim et al. | |
| 2015/0180894 A1* | 6/2015 | Sadovs | H04L 67/22 726/22 |
| 2015/0332043 A1* | 11/2015 | Russello | G06F 21/52 726/23 |
| 2016/0099963 A1* | 4/2016 | Mahaffey | H04L 63/0227 726/25 |
| 2016/0149924 A1 | 5/2016 | Iverson et al. | |
| 2016/0254961 A1* | 9/2016 | Maes | G06F 11/3093 709/226 |
| 2016/0380977 A1* | 12/2016 | Bean | H04L 63/1483 726/12 |
| 2017/0024571 A1 | 1/2017 | Nayberg et al. | |
| 2017/0111368 A1 | 4/2017 | Hibbert et al. | |
| 2017/0163666 A1* | 6/2017 | Venkatramani | H04L 63/1416 |
| 2017/0235958 A1 | 8/2017 | Khosravi et al. | |
| 2019/0005267 A1 | 1/2019 | Soman et al. | |
| 2019/0243985 A1 | 8/2019 | Goodridge et al. | |
| 2022/0229916 A1 | 7/2022 | Soman et al. | |

\* cited by examiner

SECURITY DETECTION SYSTEM WITH PRIVILEGE MANAGEMENT

BACKGROUND

A data center, in some cases, comprises a plurality of hosts in communication over a physical network infrastructure, each host having one or more virtual computing instances (VCIs) such as virtual machines (VMs) or containers that are connected to logical overlay networks that may span multiple hosts and are decoupled from the underlying physical network infrastructure. Applications running on such VMs are susceptible to malicious attacks. Though certain embodiments are described herein with respect to VMs, it should be noted that the teachings herein may also apply to other types of VCIs.

A malicious attack (e.g., such as performed by malware) on a VM often attacks the application level (e.g., by spreading through the operating environment of the VM, introducing new processes, manipulating processes to communicate with new insecure devices, etc.). AppDefense™ from VMware, Inc. in Palo Alto, Calif. is a product that aims to protect against malicious attacks on VMs and cloud environments. AppDefense™ is a data center endpoint security product that protects applications running on VMs in logical networks. AppDefense™ verifies behaviors of a VM (e.g., actions of a process, including one or more known processes, unwanted processes, changed processes, and/or changed network connections communication ports, etc.) using a data set generated from one or more past behaviors of the VM (e.g., a behavior history or an intended state), which may include behaviors of one or more applications executed by the VM.

A security manager (e.g., AppDefense™) is typically installed in virtualization software (e.g., a hypervisor) to provide an isolated location where it can monitor one or more behaviors of a VM and generate a data set (or a digital profile) of the VM including information indicating the one or more behaviors. A detection system in communication with the security manager detects a security threat when, for example, a behavior indicated in the digital profile is not indicated in a behavior history for the VM. For example, the digital profile of a VM may indicate the creation of a child process that is not indicated by the behavior history of the VM. In such cases, the child process may be treated as a security threat, based on which one or more action may be taken to address the security threat. For example, an alert may be issued, the child process may be blocked, the VM may be quarantined by adjusting dynamic firewall perimeters, or a response from the VM may be requested before the child process is allowed to proceed.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1A:
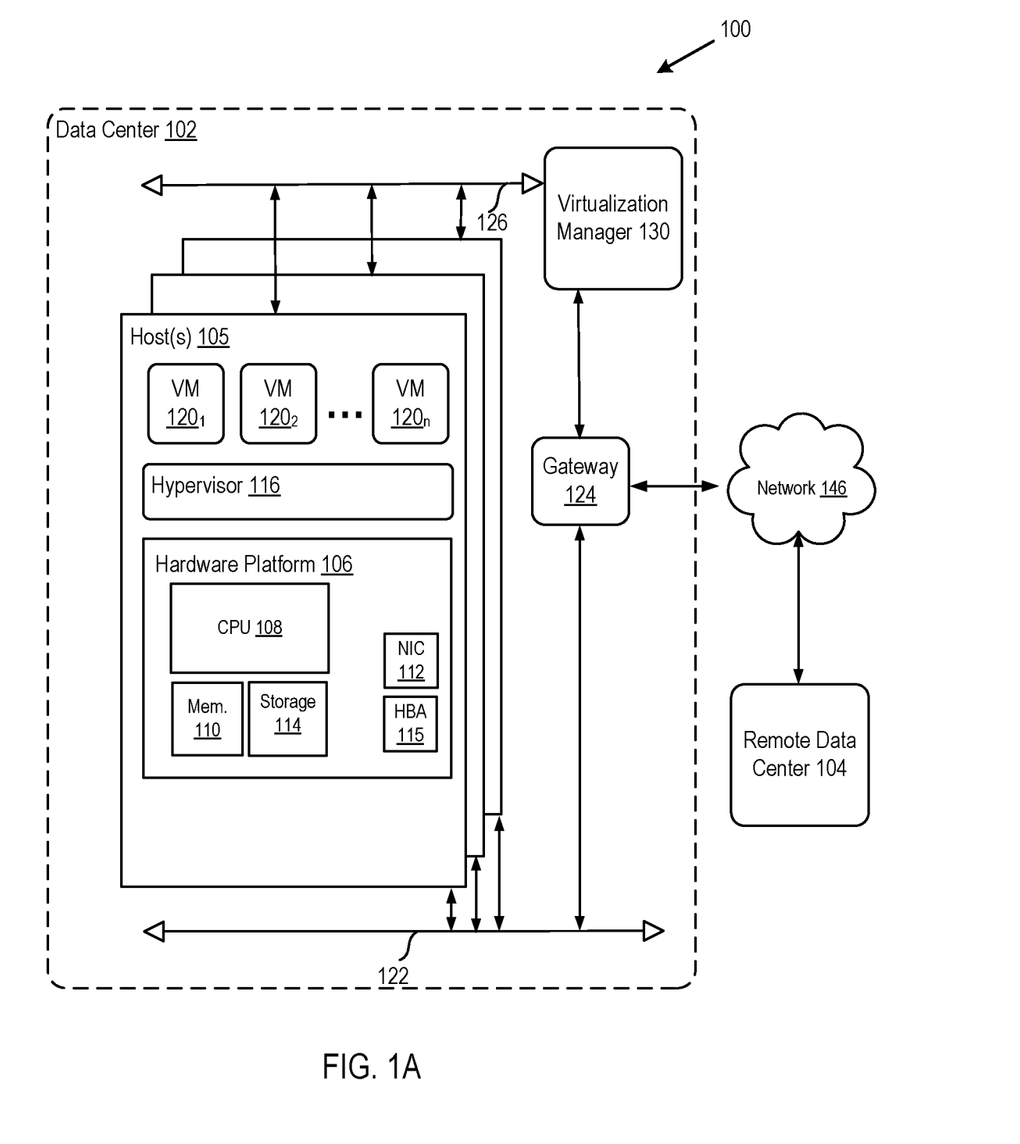
FIG. 1A is a block diagram illustrating a computing system, in accordance with certain aspects of the disclosure.

FIG. 1A depicts a block diagram of a computer system 100 in accordance with the disclosure. Data center 102 may be a local data center or a cloud data center (e.g., Amazon Web Services (AWS), Google Cloud, etc.). Data center 102 includes host(s) 105, a gateway 124, a virtualization manager 130, a management network 126, and a data network 122. Each of hosts 105 is typically on a server grade hardware platform 106, such as an x86 architecture platform. Hosts 105 may be geographically co-located servers on the same rack or on different racks in any location in data center 102.

Host 105 is configured with a virtualization layer, referred to herein as hypervisor 116, that abstracts processor, memory, storage, and networking resources of hardware platform 106 into multiple virtual machines $120_1$ to $120_n$ (collectively referred to as VMs 120 and individually referred to as VM 120). VMs on the same host 105 may use any suitable overlaying guest operating system(s) and run concurrently with the other VMs.

Hypervisor 116 architecture may vary. In some aspects, hypervisor 116 can be installed as system level software directly on the hosts 105 (often referred to as a "bare metal" installation) and be conceptually interposed between the physical hardware and the guest operating systems executing in the VMs. Alternatively, hypervisor 116 may conceptually run "on top of" a conventional host operating system in the server. In some implementations, hypervisor 116 may comprise system level software as well as a privileged VM machine (not shown) that has access to the physical hardware resources of the host 105. In such implementations, a virtual switch, virtual tunnel endpoint (VTEP), etc., along with hardware drivers, may reside in the privileged VM. One example of hypervisor 116 that may be used is a VMware ESXi™ hypervisor provided as part of the VMware vSphere® solution made commercially available from VMware, Inc. of Palo Alto, Calif.

Hardware platform 106 of each host 105 includes components of a computing device such as one or more processors (CPUs) 108, a system memory 110, a network interface 112, a storage system 114, a host bus adapter (HBA) 115, and other I/O devices such as, for example, a mouse and keyboard (not shown). CPU 108 is configured to execute instructions such as executable instructions that perform one or more operations described herein. The executable instructions may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks.

Gateway 124 (e.g., executing as a virtual appliance) provides VMs 120 and other components in data center 102 with connectivity to network 146 used to communicate with other devices (e.g., remote data center 104). Gateway 124 manages external public IP addresses for VMs 120 and routes traffic incoming to and outgoing from data center 102 and provides networking services, such as firewalls, network address translation (NAT), dynamic host configuration protocol (DHCP), and load balancing. Gateway 124 uses data network 122 to transmit data network packets to hosts 105. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

System memory ("memory") 110 is hardware for allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) couples host 105 to one or more external storages (not shown), such as a storage area network (SAN) or a distributed virtual SAN. Other external storages that may be used include a network-attached storage (NAS) and other network data storage systems, which may be accessible via NIC 112. Storage system 114 represents persistent storage device(s). Storage 114 may be one or more hard disks, flash memory modules, solid state disks, and/or optical disks. Data on storage disks of storage 114 may be organized into blocks, and each block on storage system 114 may be addressable. Although storage 114 is shown as being local to host 105, storage 114 may be external to host 105, such as by connection via HBA 115.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc. Though certain aspects are described herein with respect to VMs, such aspects are also applicable to other types of virtual computing instances, such as containers.

In certain aspects, virtualization manager 130 includes a hybrid cloud management module (not shown) configured to manage and integrate virtualized computing resources provided by remote data center 104 with virtualized computing resources of data center 102 to form a unified computing platform. The hybrid cloud manager module is configured to deploy VMs in remote data center 104, transfer VMs from data center 102 to remote data center 104, and perform other "cross-cloud" administrative tasks. In certain aspects, hybrid cloud manager module is a plug-in complement to virtualization manager 130, although other implementations may be used, such as a separate computer program executing in a central server or running in a VM in one of hosts 105. One example of hybrid cloud manager module is the VMware vCloud Connector® product made available from VMware, Inc.

Figure 1B:
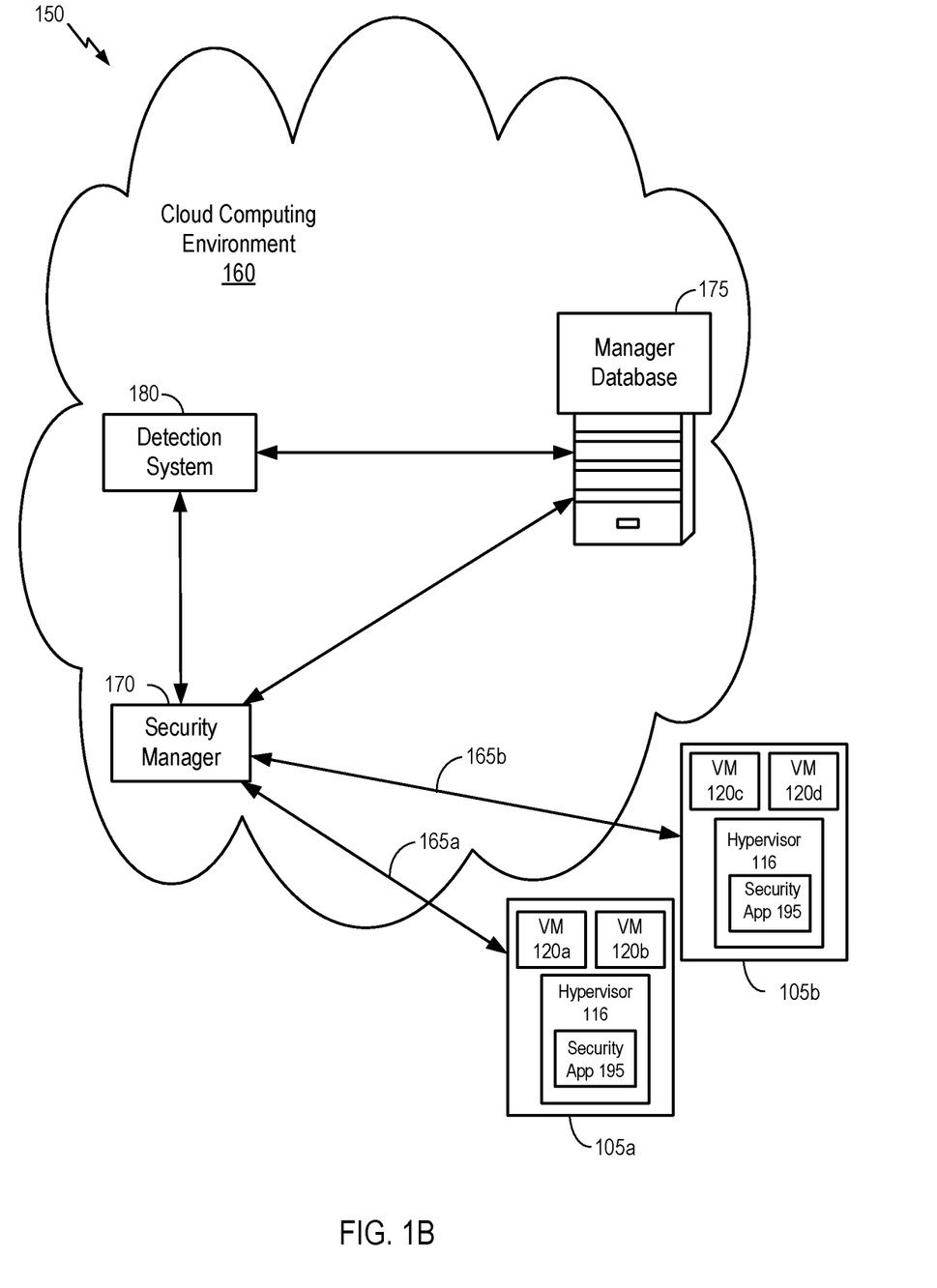
FIG. 1B is a block diagram illustrating a computing system including a cloud computing environment secured by a security manager and a detection system, in accordance with certain aspects of the disclosure.

FIG. 1B is a block diagram of a computing system 150, in which certain aspects may be practiced. Computing system 150 includes a cloud computing environment 160, which may be a data center (e.g., data center 102 or remote data center 104 in FIG. 1A). Cloud computing environment 160 includes hardware resources, storage resources, and networking resources (not shown). Hardware resources may include a number of physical servers/hosts (e.g., hosts 105). Storage resources may include a storage area network (SAN), distributed virtual SAN, or network-attached storage (NAS) and other network data storage systems. Networking resources may include switches, routers, and other network devices for connecting hosts together, hosts to storage resources, and hosts with network entities outside cloud computing environment 160.

In one aspect, cloud computing environment 160 is configured as a dedicated cloud service for a single tenant comprised of dedicated hardware resources (i.e., physically isolated from hardware resources used by other users). In other aspects, cloud computing environment 160 is configured as part of a multi-tenant cloud service with logically isolated virtualized computing resources on a shared physical infrastructure. Processes and applications can be executed on the hardware resources of cloud computing environment 160. For example, processes and applications can be directly executed on hosts of cloud computing environment 160, or in VMs or other virtual entities running on hosts of cloud computing environment 160. These processes and application may communicate with one another over the network resources, or may even be located on the same hardware resource.

Computing system 150 includes a plurality of VMs 120 and hypervisors 116 running on one or more hosts (e.g., shown as VMs 120a-120d running on hosts 105a-105b) in communication with cloud computing environment 160 through connections 165 (e.g., via a PNIC of hosts 105 and network resources of cloud computing environment 160 (not shown)) to a security manager 170 running as a process/application on hardware resources of cloud computing environment 160. In certain aspects, hosts 105 running VMs 120 are located in the same data center as cloud computing environment 160. In certain aspects, hosts 105 running VMs 120 are located on a separate data center (e.g., data center 102 in FIG. 1A) connected to cloud computing environment 160 through a network (e.g., network 146 in FIG. 1A).

Hypervisors 116 running on hosts 105 include security appliances 195. A security appliance 195 can be prepackaged as part of a hypervisor 116, or may be subsequently added to a hypervisor 116 as additional code/software. Security manager 170 is in communication with security appliances 195 in hypervisors 116 on VMs 120 through connections 165.

Cloud computing environment 160 further includes a detection system 180 running as a process/application on hardware resources of cloud computing environment 160. Detection system 180 is in communication with security manager 170. Detection system 180 is in further communication with a manager database 175. Manager database 175 can be implemented on storage resources of cloud computing environment 160. Security manager 170 is in further communication with manager database 175.

As described above, processes and applications can be directly executed in VMs or other virtual entities running on hosts of cloud computing environment 160. In certain aspects, when an application or a process ("application/process") is executed in a VM 120, detection system 180 uses what is called an "intended state" to detect security threats associated with the process or application by comparing a digital profile of the VM (e.g., VM 120) to an intended state associated with the VM. In certain aspects, instead of a detection system 180, a service (e.g., security agent 250 of FIG. 2) executing in the VM is configured to compare the intended state of a VM with its digital profile in order to detect security threats. Using such a service may, in certain aspects, reduce the latency that results from communication with an external system, such as detection system 180.

An intended state is a data set comprising information indicative of one or more behaviors that are indicative of a healthy computing environment (e.g., indicative of no unwanted behaviors in the data set). An intended state may be generated by security manager 170 during a "learning stage" in a number of ways. As an example, security manager 170 generates an intended state for a VM, such as VM 120a, by monitoring one or more behaviors on one or more VMs (e.g., VMs 120a and 120b) over an observation period. Security manager 170 then stores the generated intended state in manager database 175. In one example, security appliance 195 in hypervisor 116 on host 105a records one or more behaviors of VM 120a and VM 120b over an observation period and sends the one or more recorded behaviors to security manager 170. Security manager 170 monitors the one or more behaviors sent by security appliances 195 and saves information indicative of at least one behavior as an intended state in manager database 175. In certain aspects, generating an intended state involves monitoring the behavior of one or more of VMs 120a and 120b executing one or more applications/processes (e.g., a server application, an operating system process (e.g., a Microsoft Windows operating system process), etc.).

After an intended state is generated by security manager 170 for VM 120a, security manager 170 proceeds to generate a digital profile of VM 120a in part by monitoring one or more behaviors of VM 120a using security appliance 195 over a monitoring period and storing information indicative of the one or more monitored behaviors as a digital profile of VM 120a in manager database 175. In certain aspects, detection system 180 accesses an intended state associated with VM 120a and a digital profile of VM 120a from manager database 175 and compares the digital profile to the intended state and determines if the digital profile is indicative of a security threat on VM 120a. In certain aspects, detection system 180 determines that a digital profile contains information indicative of a behavior indicative of a security threat on VM 120a when the digital profile of VM 120a contains information indicative of a behavior that is not indicated in an intended state associated with VM 120a. In other aspects, detection system 180 detects a security threat when one or more behaviors indicated in the digital profile of a VM 120a is an outlier (e.g., using a halo-entropy based detection method). For example, a behavior indicated in the digital profile of VM 120a may indicate a deviation from the intended state of VM 120a. In one example, this deviation may be the launch of a child process by an application/process. In such an example, detection system 180 may treat the child process as a security threat because a comparison between the digital profile and the intended state of VM 120a indicates that the child process is, for example, an unknown process. As described above, in certain aspects, instead of detection system 180, a service (e.g., security agent 250 of FIG. 2) executing in the VM is configured to perform the tasks described above.

After detection system 180 (or security agent 250 of FIG. 2) determines that a digital profile of a VM is, for example, indicative of a security threat on the VM, the child process may be blocked, the VM may be quarantined by adjusting dynamic firewall perimeters, or a response from the VM may be requested before the child process is allowed to proceed.

However, simply because an application/process corresponds to a deviation from the intended state of a VM does not mean that the application/process is malicious and should be treated as a security threat. In certain cases, it may be more advantageous to de-elevate the privileges of an application/process instead of treating it as a security threat and, for example, blocking its execution. As an example, detection system 180 may treat an unknown child process as a security threat because the child process did not occur during the learning stage and, therefore, was not included in the intended state. However, the child process, in some cases may be a legitimate process. As a result, it is advantageous to distinguish applications/processes that are only potentially malicious from applications/processes that are definitely malicious. In such cases, it is further advantageous to de-elevate the potentially malicious application/process instead of treating it as malicious and, therefore, a security threat. This provides protection to the computing system while still allowing critical applications to function.

Accordingly, certain embodiments described herein relate to de-elevating applications/processes that are determined to be potentially malicious by detection system 180. In certain aspects, to determine whether an application/process is potentially malicious, a service running inside a VM, shown as security agent 250 in FIG. 2, may be configured to compare an intended state of the VM running the application with a digital profile of the VM while also checking the reputation of the application/process with a reputation checking system. As described in further detail below, in certain aspects, if an application/process corresponds to a deviation from the intended state of a VM and is not determined to be malicious by the reputation checking system, the application/process is identified as potentially malicious. However, if the deviating application/process is determined to be malicious by the reputation checking system, it is identified as definitely malicious and, therefore, treated as a security threat. Note that although the embodiments herein are described in reference to a VM, the techniques and operations described herein are similarly applicable to any type of computing device, which may be a VCI (e.g., VM, container, etc.) or a physical computing device.

Figure 2:
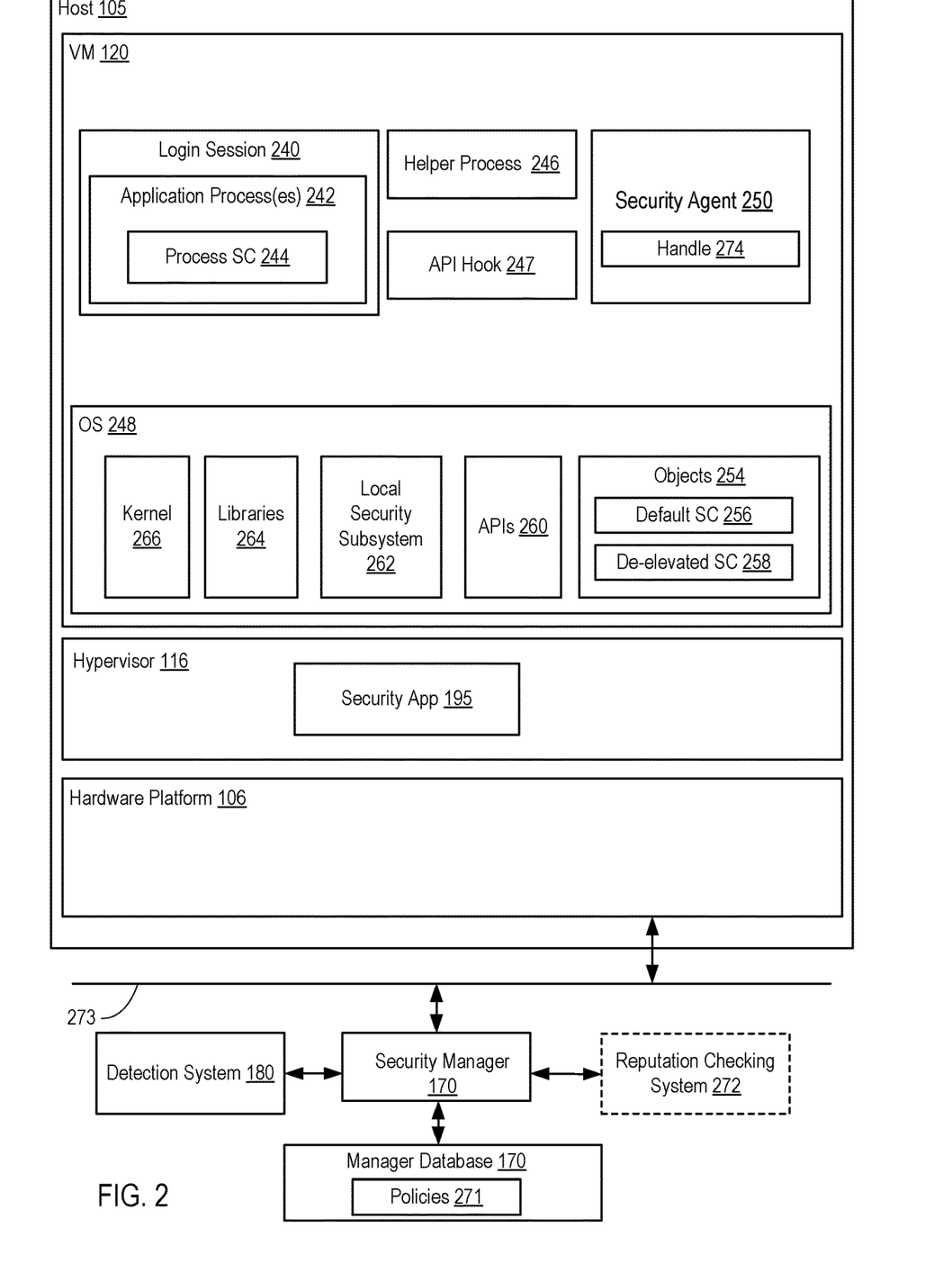
FIG. 2 is a block diagram illustrating a host in the computing system of FIG. 1A, in accordance with certain aspects on the disclosure.

FIG. 2 illustrates a block diagram depicting host 105 in communication with security manager 170 through network 273 (e.g., corresponding to network 122 and/or 146). Security manager 170 is in communication with detection system 180, reputation checking system 272, and manager database 170. In certain embodiments, reputation checking system 272 runs as a process/application on hardware resources of cloud computing environment 160. Manager database 170 stores privilege management policies 271, which include requirements for privilege de-elevation, such as requirements that specify when an application/process's privileges should be de-elevated. In certain aspects, policies 271 are defined by an administrator. For example, an administrator can specify that the privileges of an application be de-elevated if it is designated by security agent 250 as a potentially malicious application/process. In determining whether an application/process is potentially malicious, in certain aspects, security agent 205 consults reputation checking system 272 through security manager 170. Consulting reputation checking system 272 enables security agent 205 to check the reputation of an application/process running on host 105.

Also shown in FIG. 2 host 105 is executing VM 120 that is running on hypervisor 106. Host 105 also includes a number of components and software modules for enabling the de-elevation of an application/process in response to an indication of a potential security threat associated with an application/process running in VM 120. As shown, VM 120 includes an operating system (OS) 248. OS 248 includes a kernel 266, libraries 264, a local security subsystem 262, application programming interfaces (APIs) 260, and objects 254. Kernel 266 provides low-level operating system functions, such as thread scheduling, interrupt and exception dispatching, multiprocessor synchronization, memory management, security, IO, networking, inter-process communication, and the like. Kernel 266 may divide such functionality among multiple components. Libraries 264 can include libraries that are part of kernel 266, and libraries that provide a higher-level interface to kernel 266. Libraries 264 provide APIs 260 (which may be documented or undocumented) that translate functions into native system calls (which are typically undocumented). Local security subsystem 262 includes processes and associated libraries 264 that manage local security of OS 248. Local security subsystem 262 can manage various objects 254. In particular, local security subsystem 262 can create security context (SC) objects, as described further below.

OS 248 enables a user (e.g., an administrator) to log into OS 248 and launch and execute applications, such as server applications. Upon a successful login by a user, OS 248 provides a login session 240. The user can run one or more applications in login session 240, for which OS 248 creates application process(es) 242. Each application process within login session 240 has a process SC 244. In general, an SC includes information that describes a user account, security group(s) in which the user has membership, and privileges associated with the security group(s). The SC can include various other information, such as various identifiers, an expiration time, various flags, access control list (ACL) information, and the like. In certain aspects, upon a successful login by a user, local security subsystem 262 creates a default SC 256 for login session 240. As shown, default SC 256 is created as an object within objects 254. Default SC 256 includes an identifier of the logged-in user, identifier(s) of security group(s) in which the logged-in user has membership, and a list or privileges associated with the security group(s). After the user login, each of application process(es) 242 uses default SC 256 as its process SC 244.

In certain aspects, the user is from an "administrators" security group and logs in to launch one or more server applications. In such aspects, because the administrators' security group has more privileges ("administrative privileges") than a "user" security group, default SC 256 is created with a higher number of privileges (e.g., admin privileges) than a user SC (e.g., referred to, in a Microsoft Windows® operating system, as a primary access token), which is generally used for a non-administrator user in a user security group. That is, default SC 256's privileges are elevated with respect to the privileges of a user SC. The administrator privileges of SC 256 typically include additional privileges for increased control of OS 248.

VM 120 also executes security agent 250, API hook 247, and helper process 246, which are used to de-elevate the privileges of an application/process running in VM 120. In certain aspects, security agent 250 is installed in OS 248 and runs as a local system service. Security agent 250 is configured to communicate with security appliance 195 and security manager 170 through a certain set of APIs. Similar to security agent 250, API hook 247 is also installed, as part of an API library, in OS 248 and is injected by security agent 250 into application process(es) 242 of login session 240. API hook 247 is able to detect the creation of an application/process, such as a child process, before the application/process is created. Once API hook 247 detects the creation of, for example, the child process, API hook 247 passes information relating to the child process to security agent 250. Security agent 250, as described in relation to FIG. 4, then determines whether the child process is malicious, potentially malicious, or non-malicious and passes the results of that determination to API hook 247. In the event that the child process is determined to be potentially malicious, in addition to indicating that determination to API hook 247, security agent 250 also passes a de-elevated SC 258 to API hook 247. API hook 247 then uses de-elevated SC 258 to launch the child process.

Figure 3:
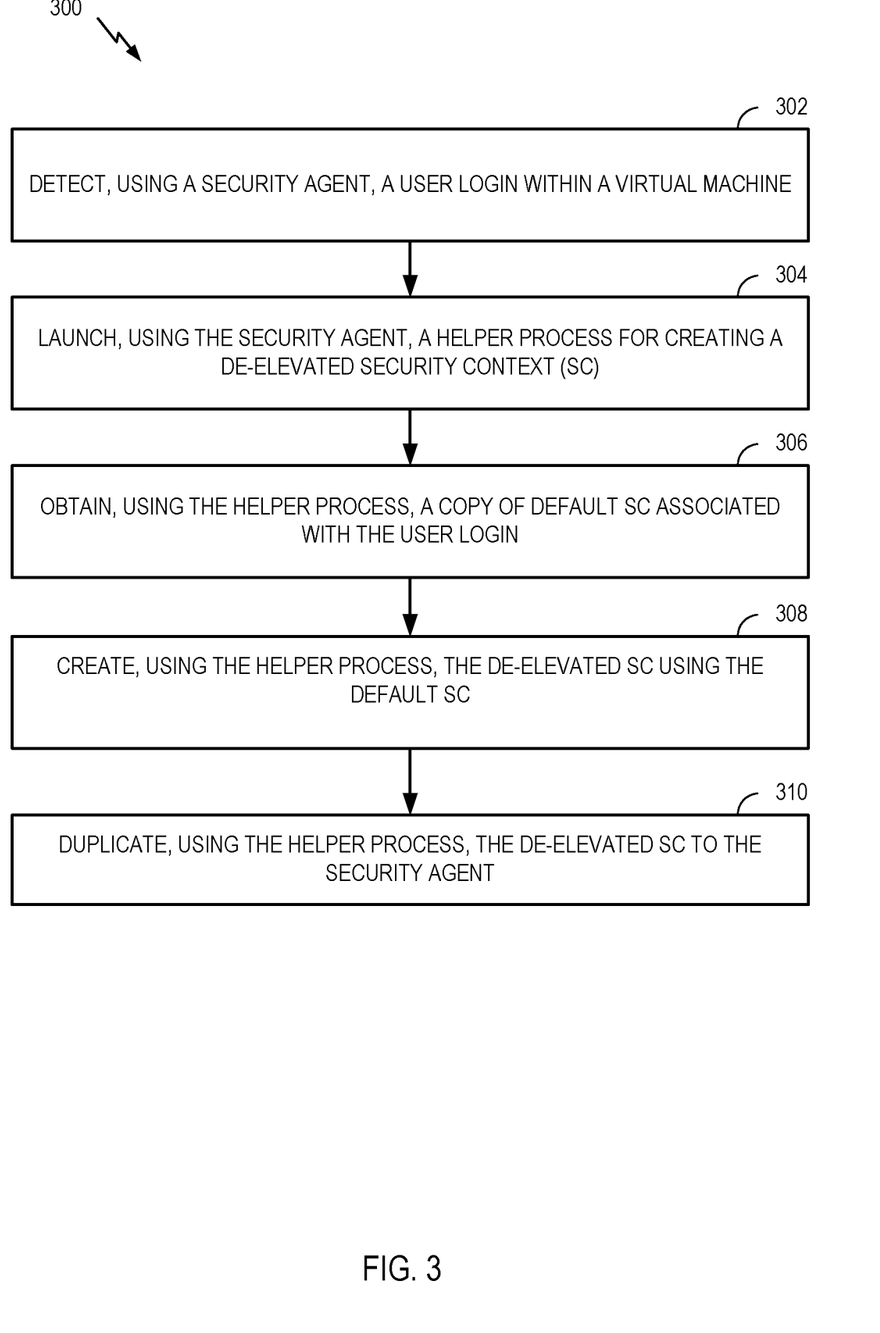
FIG. 3 is a flow diagram depicting a method of creating a de-elevated security context, according to an embodiment.

As described in relation to FIG. 3, upon a successful user login, security agent 250 is configured to launch helper process 246 to create de-elevated SC 258 that can be used by API hook 247 to de-elevate the privileges of a potentially malicious application/process.

FIG. 3 illustrates example operations 300 carried out to create de-elevated SC 258. Operations 300 are described below by reference to FIG. 2 and its components.

At block 302 of operations 300, security agent 250 detects a user login within OS 248 of VM 120.

At block 304, security agent 250 launches helper process 246 for creating a de-elevated SC. Security agent 250 creates helper process 246 with privileges sufficient to create security contexts. A normal process does not have permission to create security contexts. Typically, only a process in local security subsystem 262 has such permission to create security contexts. For example, in a Microsoft Windows® operating system, a process known as the Local Security Authority Subsystem Service (lsass) has SeCreateToken privilege enabled to call native APIs and create access tokens. In certain aspects, security agent 250 obtains the SC of the local security process that can create SCs (e.g., the token of the lsass service) and launches helper process 246 with the SC of the local security process (e.g., with the token of the lsass service). In certain aspects, helper process 246 is a special instance of security agent 250.

At block 306, helper process 246 obtains a copy of default SC 256 associated with the user login.

At block 308, helper process 246 creates de-elevated SC 258 using the copy of default SC 256. More specifically, in certain aspects, helper process 246 removes an association of the copy of default SC 256 with the administrative security group, which causes the removal of any privileges (e.g., administrative privileges) associated with the administrative security group from the copy of default SC 256. For example, in a Microsoft Windows® OS, helper process 246 removes the BUILTIN\Administrators security group and all the privileges associated with the administrative security group from the copy of default SC. Therefore, de-elevated SC 258 includes attributes of default SC 258 without the administrative privileges.

At block 310, helper process 246 duplicates de-elevated SC 258 to security agent 250. More specifically, helper process 246 duplicates a handle (e.g., identifier, or pointer) to de-elevated SC 258 in objects 254 to security agent 250. The duplicated handle is shown as handle 274. In certain aspects, helper process 246 then exits using duplicated handle 274 as exit code. After launching helper process 246 at block 304, security agent 250 enters a waiting mode to wait for helper process 246 to terminate. As a result, when, at block 310, helper process 246 terminates, security agent 250 obtains duplicated handle 274 associated with de-elevated SC 258 from helper process 246's exit code and stores de-elevated SC 258 into a session specific list. A session specific list is a list associated with a login session, such as logic session 240, which stores certain information about the login session.

Figure 4:
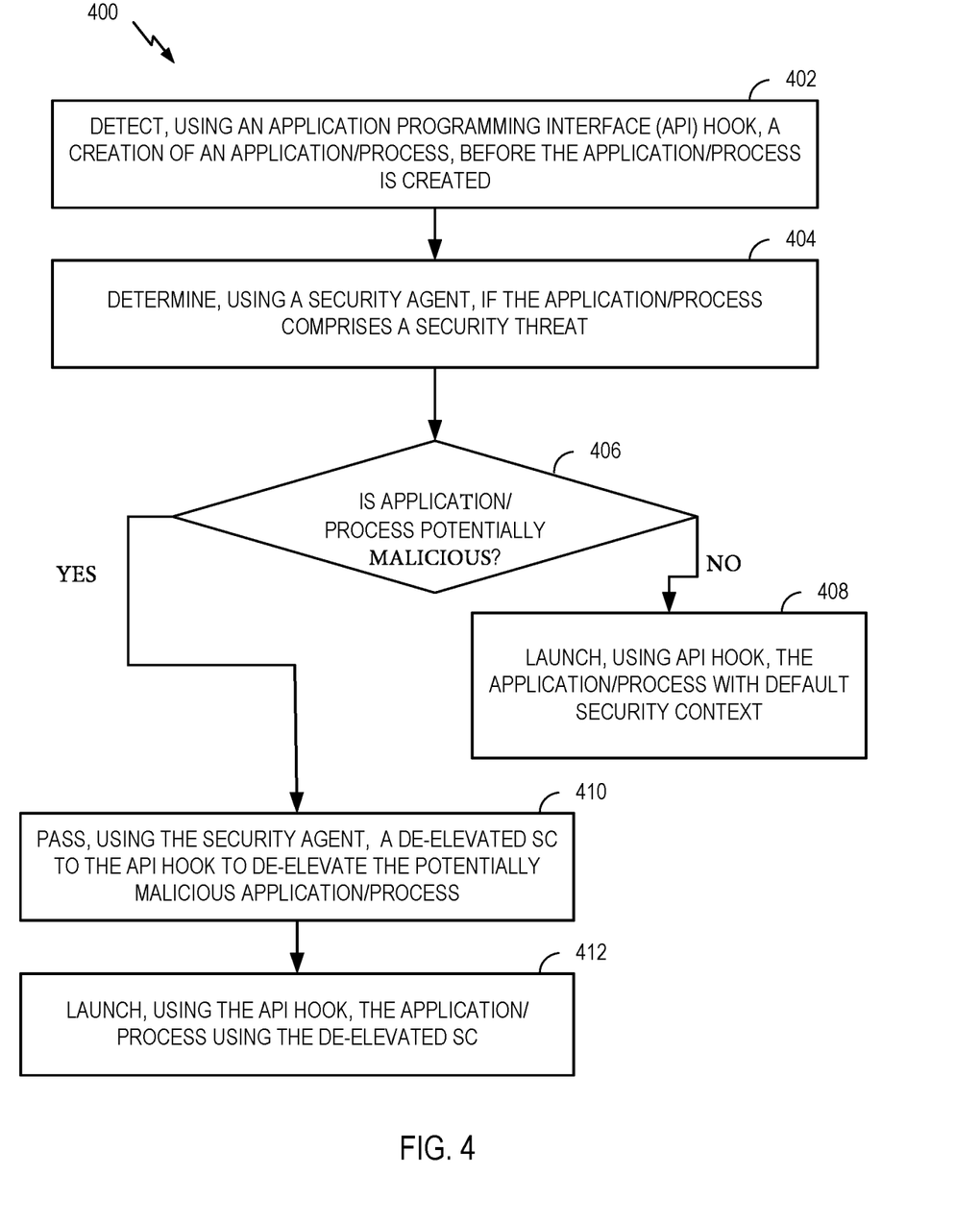
FIG. 4 is a flow diagram depicting a method of identifying an application/process as potentially malicious and de-elevating the application/process using a de-elevated security context, according to an embodiment.

As described in relation to FIG. 4, if security agent 250 determines that an application/process is potentially malicious, it passes de-elevated SC 258 to API hook 247 to de-elevate the application/process.

FIG. 4 illustrates example operations 400 carried out to de-elevate a application/process (e.g., a child process). Operations 400 are described below by reference to FIG. 2 and its components.

At block 402, API hook 247 detects the creation of an application/process running on a computing device, such as VM 120. As described above, after the user login, the user may launch one or more applications/processes within the context of login session 240. API hook 247 can detect and monitor the launch or creation of each application or process within login session 240 before the application or process is actually launched or created. For example, API hook 247 is able to detect that a parent process (e.g., application process 308) is about to create a child process, even before the child process is created. In such an example, once API hook 247 detects that a child process is about to be created, API hook 247 passes information regarding the child (e.g., its name and/or path) to security agent 250.

At block 404, security agent 250 determines if the application/process comprises a security threat. In certain aspects, as described above, security agent 150 compares an intended state of the VM and a digital profile of the VM to determine if an application/process comprises a security threat. For example, to determine if a child process created by a parent process (e.g., application process 308) running in VM 120 is a security threat (or malicious), security agent 250 retrieves the intended state of VM 120 of VM 120 from manager database 170 and performs a comparison of the intended state and the digital profile of VM 120. In such an example, the intended state of VM 120 has been previously created by security manager 170 by observing one or more behaviors of VM 120 while running the parent process during the learning stage. The parent process refers to the process that is creating the child process, whose creation is detected by API hook 247, as described above. The intended state of VM 120 is compared with a digital profile of VM 120, which includes the information related to the child process (e.g., the information shared by API hook 247 with security agent 250 relating to the child process).

Based on the comparison, security agent 250 determines that the application/process (e.g., child process) is malicious, potentially malicious, or non-malicious. For example, if the launch of the application/process is included in (e.g., does not deviate from) the intended state of VM 120, in certain aspects, security agent 250 determines that the application/process is non-malicious. In the example of a child process, if the child process is created by the parent process while security manager 170 is observing VM 120 during the learning stage (i.e., the child process is included in or indicated by the intended state of VM 120), security agent 250 may determine that the child process is non-malicious.

If the application/process is determined to be non-malicious, at block 408, API hook 247 launches the application/process (or allow the launch to proceed) with default SC 256. In certain aspects, API hook 247 performs block 408 in consultation with policies 271. Policies 271 are retrieved and stored in a memory of VM 120 for use and access by API hook 247 and security agent 250 during the operations described herein. Policies 271, for example, may indicate that a non-malicious application/process should be allowed to be launched with default SC 256. In such an example, once security agent 250 determines that an application/process is non-malicious, it indicates that information to API hook 247. In response, API hook 247 launches the application/process with default SC 256.

If, however, the launch of the application/process is a deviation from the intended state of VM 120, in certain aspects, security agent 250 determines that the application/process is potentially malicious. If the application/process is determined to be potentially malicious, in certain aspects, through security manager 170, security agent 250 further consults reputation checking system 272 in order to check whether the application/process is a known malware, in which case the application/process is determined to be malicious (as opposed to being only potentially malicious). Reputation checking system 272, in certain aspects, is an external threat intelligence vendor that communicates with security manager 170 through a set of APIs.

For example, in certain aspects, through security manager 170, security agent 250 calls an API of reputation checking system 272 to inquire whether an application/process (e.g., child process) that is a deviation from the intended state of VM 120 is malicious. In some cases, reputation checking system 272 responds by indicating that the application/process is a known malware. In such cases, security agent 250 treats the application/process as malicious (e.g., as opposed to just potentially malicious) and may take certain actions to prevent the application/process from launching. For example, in certain aspects, policies 271 may indicate that an application that is determined to be malicious should be blocked by API hook 247.

In other cases, reputation checking system 272 is not able to designate the application/process as malicious. This may be because the application/process is either non-malicious or it is malicious but it is an unknown security threat (e.g., unknown malware) to reputation checking system 272. In such cases, security agent 250 treats the application/process as potentially malicious, in which case, security agent 250 is configured to de-elevate the application/process.

At block 410, security agent 250 passes a de-elevated SC (e.g., de-elevated SC 258) to API hook 247 to de-elevate the privileges of the application/process. For example, after consultation with policies 271, security agent 250 170 may determine that a potentially malicious application/process should be de-elevated. As a result, security agent 250 passes de-elevated SC 258 to API hook 247 and requests API hook 247 to de-elevate the application/process.

At block 412, API hook 247 launches the application/process using the previously created de-elevated SC. For example, after receiving de-elevated SC 258 and an indication from security agent 250 that the application/process is potentially malicious, API hook 247 launches the application/process using de-elevated SC 258.

Accordingly, the aspects described herein provide a technical solution of solving a technical problem with respect to treating applications/processes that deviate from the intended state of a computing device (e.g., a VM). More specifically, the technical solution enables the determination of whether an application/process is potentially malicious by comparing a digital profile of a computing device with its intended state, as described above, while also checking the reputation of the application/process with a reputation checking system. Once the application/process is determined to be potentially malicious, the technical solution also enables de-elevating the application/process as opposed to treating it as malicious and, for example, blocking it. As such, implementing the technical solution provides protection to the computing device while still allowing critical applications to function.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of de-elevating a process created in a computing device of a computer system, comprising:
    detecting a user login within a login session of the computing device in the computer system, the login session having a default security context;
    creating a de-elevated security context for the login session, wherein the de-elevated security context has fewer privileges than the default security context;
    detecting a process to be created within the login session prior to the process actually being created;
    prior to creating the process, determining whether the process is potentially malicious based on comparing an intended state and a digital profile of the computing device, wherein the determining of whether the process is potentially malicious comprises:
        determining the process is not potentially malicious if the digital profile does not indicate deviation from the intended state;
        determining that the process is malicious if the digital profile indicates deviation from the intended state and a reputation checking system indicates that the process is known to be malicious; and
        determining that the process is potentially malicious if the digital profile indicates deviation from the intended state and the reputation checking system indicates that the process is not known to be malicious;
    launching the process using the default security context when determining that the process is not potentially malicious;
    preventing launching of the process when determining that the process in malicious; and
    launching the process using the de-elevated security context when determining that the process is potentially malicious.

2. The method of claim 1, wherein creating the de-elevated security context for the login session further comprises:
    launching a helper process with a special security context that enables the helper process to create new security contexts;
    obtaining a copy of the default security context; and
    creating the de-elevated security context using the copy of the default security context.

3. The method of claim 2, wherein the special security context is another process enabled to create or cause other processes, including the helper process, to create security contexts.

4. The method of claim 2, wherein creating the de-elevated security context using the copy of the default security context further comprises:
    creating the de-elevated security context by removing an association of the copy of the default security context with an administrative security group, causing a removal of privileges associated with the administrative security group from the copy of the default security context.

5. The method of claim 2, further comprising:
duplicating the de-elevated security context to a security agent running within the computing device.

6. The method of claim 1, wherein:
the intended state of the computing device is created by a security manager by observing at least one of the computing device or one or more other computing devices in the computer system during a learning stage, and
the digital profile of the computing device includes information about the process.

7. The method of claim 1, further comprising:
retrieving the intended state and the digital profile of the computing device from a manager database.

8. An apparatus, comprising:
a non-transitory memory comprising executable instructions; and
a processor in data communication with the memory and configured to execute the instructions to cause the apparatus to:
detect a user login within a login session of the apparatus in a computer system, the login session having a default security context;
create a de-elevated security context for the login session, wherein the de-elevated security context has fewer privileges than the default security context;
detect a process to be created within the login session prior to the process actually being created;
prior to creating the process, determine whether the process is potentially malicious based on comparing an intended state and a digital profile of a computing device, wherein the determining of whether the process is potentially malicious comprises:
determining that the process is not potentially malicious if the digital profile does not indicate deviation from the intended state;
determining that the process is malicious if the digital profile indicates deviation from the intended state and a reputation checking system indicates that the process is known to be malicious; and
determining that the process is potentially malicious if the digital profile indicates deviation from the intended state and the reputation checking system indicates that the process is not known to be malicious;
launch the process using the default security context when determining that the process is not potentially malicious;
prevent launching of the process when determining that the process is malicious; and
launch the process using the de-elevated security context when determining that the process is potentially malicious.

9. The apparatus of claim 8, wherein causing the apparatus to create the de-elevated security context for the login session further comprises causing the apparatus to:
launch a helper process with a special security context that enables the helper process to create new security contexts;
obtain a copy of the default security context; and
create the de-elevated security context using the copy of the default security context.

10. The apparatus of claim 9, wherein the special security context is another process enabled to create or cause other processes, including the helper process, to create security contexts.

11. The apparatus of claim 9, wherein causing the apparatus to create the de-elevated security context using the copy of the default security context further comprises causing the apparatus to:
create the de-elevated security context by removing an association of the copy of the default security context with an administrative security group, causing a removal of privileges associated with the administrative security group from the copy of the default security context.

12. The apparatus of claim 9, wherein the processor is configured to execute the instructions to further cause the apparatus to:
duplicate the de-elevated security context to a security agent running within the apparatus.

13. The apparatus of claim 8, wherein:
the intended state of the apparatus is created by a security manager by at least one of observing the apparatus or one or more other apparatuses in the computer system during a learning stage, and
the digital profile of the apparatus includes information about the process.

14. The apparatus of claim 8, wherein the processor is configured to execute the instructions to further cause the apparatus to:
retrieve the intended state and the digital profile of the apparatus from a manager database.

15. A non-transitory computer readable medium having instructions stored thereon that, when executed by a computing device in a computer system, cause the computing device to perform a method comprising:
detecting a user login within a login session of the computing device in the computer system, the login session having a default security context;
creating a de-elevated security context for the login session, wherein the de-elevated security context has fewer privileges than the default security context;
detecting a process to be created within the login session prior to the process actually being created;
prior to creating the process, determining whether the process is potentially malicious based on comparing an intended state and a digital profile of the computing device, wherein the determining of whether the process is potentially malicious comprises:
determining that the process is not potentially malicious if the digital profile does not indicate deviation from the intended state;
determining that the process is malicious if the digital profile indicates deviation from the intended state and a reputation checking system indicates that the process is known to be malicious; and
determining that the process is potentially malicious if the digital profile indicates deviation from the intended state and the reputation checking system indicates that the process is not known to be malicious;
launching the process using the default security context when determining that the process is not potentially malicious;
preventing launching of the process when determining that the process is malicious; and
launching the process using the de-elevated security context when determining that the process is potentially malicious.

16. The non-transitory computer readable medium of claim 15, wherein creating the de-elevated security context for the login session further comprises:

launching a helper process with a special security context that enables the helper process to create new security contexts;
obtaining a copy of the default security context; and
creating the de-elevated security context using the copy of the default security context.

17. The non-transitory computer readable medium of claim 16, wherein the special security context is another process enabled to create or cause other processes, including the helper process, to create security contexts.

18. The non-transitory computer readable medium of claim 16, wherein creating the de-elevated security context using the copy of the default security context further comprises:
creating the de-elevated security context by removing an association of the copy of the default security context with an administrative security group, causing a removal of privileges associated with the administrative security group from the copy of the default security context.

* * * * *